(12) United States Patent
Uebayashi et al.

(10) Patent No.: US 7,116,647 B2
(45) Date of Patent: Oct. 3, 2006

(54) CHANNEL ASSIGNING METHOD AND COMMUNICATION APPARATUS

(75) Inventors: Shinji Uebayashi, Kanagawa (JP); Toshiyuki Futakata, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 812 days.

(21) Appl. No.: 09/889,000

(22) Filed: Jun. 22, 2001

(65) Prior Publication Data

US 2001/0055288 A1    Dec. 27, 2001

(30) Foreign Application Priority Data

Jun. 23, 2000    (JP)    ............................. 2000-190173

(51) Int. Cl.
*H04Q 7/00* (2006.01)
*H04B 7/216* (2006.01)
*H04J 3/16* (2006.01)

(52) U.S. Cl. ...................... 370/329; 370/342; 370/437; 370/441

(58) Field of Classification Search ................ 370/276, 370/280, 281, 331, 332, 333, 335, 320, 437, 370/328–339, 341–342, 441
See application file for complete search history.

(56) References Cited

U.S. PATENT DOCUMENTS

| 5,712,868 | A | * | 1/1998 | Stern et al. ................... 375/132 |
| 5,933,421 | A | * | 8/1999 | Alamouti et al. ............ 370/330 |
| 6,047,176 | A | * | 4/2000 | Sakamoto et al. ......... 455/422.1 |
| 6,122,270 | A | * | 9/2000 | Whinnett et al. ............ 370/342 |
| 6,128,288 | A | * | 10/2000 | Miya .......................... 370/335 |
| 6,351,458 | B1 | * | 2/2002 | Miya et al. .................. 370/330 |
| 6,587,444 | B1 | * | 7/2003 | Lenzo et al. ................. 370/330 |
| 6,611,507 | B1 | * | 8/2003 | Hottinen et al. ............. 370/331 |
| 6,795,409 | B1 | * | 9/2004 | Youssefmir et al. ......... 370/328 |
| 2002/0105935 | A1 | * | 8/2002 | Miya .......................... 370/342 |
| 2003/0165125 | A1 | * | 9/2003 | Moulsley .................... 370/331 |

FOREIGN PATENT DOCUMENTS

| DE | 198 30 841 A1 | 1/2000 |
| EP | 0975184 A1 | 1/2000 |
| EP | 1009183 | 6/2000 |
| JP | 05-252098 | 9/1993 |

(Continued)

OTHER PUBLICATIONS

Povey et al.; "Hybrid FDD/TDD-CDMA for third generation cellular systems"; CDMA Techniques and Applications for Third Generation Mobile Systems (Digest No: 1997/129), IEE Colloquium on May 19, 1997 pp. 2/1-2/6.*

(Continued)

*Primary Examiner*—Chi Pham
*Assistant Examiner*—Tri H. Phan
(74) *Attorney, Agent, or Firm*—Workman Nydegger

(57) ABSTRACT

A channel assigning method and a communication apparatus for executing appropriate channel assignment in a mobile communication system when both a channel for a service area based on a FDD method and a channel for a service area based on a TDD method can be assigned are provided. For example, if both a channel for a service area based on a CDMA-FDD method and channels for service areas based on a CDMA-TDD method can be assigned to a request for channel assignment, and a handover frequency of the mobile station related to the request is high, the channel for the service area based on the CDMA-FDD method is assigned.

45 Claims, 9 Drawing Sheets

FOREIGN PATENT DOCUMENTS

| | | |
|---|---|---|
| JP | 07-212817 | 8/1995 |
| JP | 09-116458 | 5/1997 |
| JP | 09-200826 | 7/1997 |
| JP | 09-205673 | 8/1997 |
| JP | 2000-092570 | 3/2000 |
| JP | 2000-175244 | 6/2000 |
| WO | WO 96/23369 | 8/1996 |
| WO | WO 97/31503 | 8/1997 |
| WO | WO 00/27158 | 5/2000 |

OTHER PUBLICATIONS

SIEMENS XP-002193759 UMTS Opening Up a World of Opportunities Information and Communications Copyright 1999.

G. Noubir, "Inter-layer radio resource management for hierarchical cell structures in the frames project," Global Telecommunications Project, Globecom 1998, pp. 2483-2488, Nov. 8, 1998.

Siemens, "UMTS Opening up a world of opportunities," Siemens AG, Munich, http://www2.siemens.no/multimedia/archive/00050/umts_50271a/pdf, 1999.

H. Haas, "The effect of adjacent channel interference on capacity in a hybrid TDMA/CDMA-TDD system using UTRA-TDD parameters," Vehicular Technology Conference, Sep. 19, 1999.

G. Povey, "TDD-CDMA extension to FDD-CDMA based third generation cellular system," 1997 IEEE 6th International conference on universal personal communications, pp. 813-817, Oct. 12, 1997.

H. Holma, ed., "WCDMA for UMTS," John Wiley & Sons, Jun. 2000.

Official Notice of Rejection; Case No.: DCMH120076; Patent Application No.: 2000-190173.

Official Notice of Rejection; Case No.: DCMH120076; Patent Application No.: 2000-190173.

* cited by examiner

CHANNEL ASSIGNING METHOD AND COMMUNICATION APPARATUS

This application claims priority under 35 U.S.C. 119 to Patent Application No. 2000-190173 filed Jun. 23, 2000 in Japan, the content of which is incorporated hereinto by reference.

BACKGROUND OF THE INVENTION

1. Field of the Invention

The present invention relates to a channel assigning method and a communication apparatus, and more specifically, a channel assigning method and a communication apparatus for executing appropriate channel assignment in a mobile communication system when both a channel for a service area based on a FDD method (for example, a CDMA-FDD method) and a channel for a service area based on a TDD method (for example, a CDMA-TDD method) can be assigned.

2. Description of the Related Art

There have been no examples in which two or more types of air interfaces provide the same service.

On the other hand, CDMA (Code Division Multiple Access) methods for use in mobile communication or the like include, for example, the CDMA-FDD (Frequency Division Duplex) method and the CDMA-TDD (Time Division Duplex) method, as discussed in the IMT-2000.

SUMMARY OF THE INVENTION

It is thus contemplated that both FDD and TDD methods may be used to provide services.

In such a mobile communication system, when both a channel for a service area based on the FDD method and a channel for a service area based on the TDD method can be assigned, which type of channel is assigned will be a problem.

It is an object of the present invention to execute appropriate channel assignment in a mobile communication system when both a channel for a service area based on a FDD method and a channel for a service area based on a TDD method can be assigned.

In order to accomplish the above mentioned object, in the first aspect of the present invention, there is provided a channel assigning method for assigning a channel for use in communication between a mobile station and a base station having one or more service areas, the method comprising the steps of:

judging, when a request for channel assignment is issued, whether a condition that it is possible to assign both a channel for a service area based on a FDD method and a channel for a service area based on a TDD method to the request, is satisfied; and assigning the channel for the service area based on the FDD method to the request, if the condition is satisfied.

In the second aspect of the present invention, there is provided a channel assigning method for assigning a channel for use in communication between a mobile station and a base station having one or more service areas, the method comprising the steps of:

judging, when a request for channel assignment is issued, whether a condition that it is possible to assign both a channel for a service area based on a FDD method and a channel for a service area based on a TDD method to the request, and a handover frequency of the mobile station related to the request is high, is satisfied; and assigning the channel for the service area based on the FDD method to the request, if the condition is satisfied.

In the third aspect of the present invention, there is provided a channel assigning method for assigning a channel for use in communication between a mobile station and a base station having one or more service areas, the method comprising the steps of:

judging, when a request for channel assignment is issued, whether a condition that it is possible to assign both a channel for a service area based on a FDD method and a channel for a service area based on a TDD method to the request, and a handover frequency of the mobile station related to the request is low, is satisfied; and assigning the channel for the service area based on the TDD method to the request, if the condition is satisfied.

In the fourth aspect of the present invention, there is provided a channel assigning method for assigning a channel for use in communication between a mobile station and a base station having one or more service areas, the method comprising the steps of:

judging, when a request for channel assignment is issued, whether a condition that it is possible to assign both a channel for a service area based on a FDD method and a channel for a service area based on a TDD method to the request, and the maximum reception power value of a forward common channel of the mobile station related to the request is low, is satisfied; and assigning the channel for the service area based on the FDD method to the request, if the condition is satisfied.

In the fifth aspect of the present invention, there is provided a channel assigning method for assigning a channel for use in communication between a mobile station and a base station having one or more service areas, the method comprising the steps of:

judging, when a request for channel assignment is issued, whether a condition that it is possible to assign both a channel for a service area based on a FDD method and a channel for a service area based on a TDD method to the request, and the maximum reception power value of a forward common channel of the mobile station related to the request is high, is satisfied; and assigning the channel for the service area based on the TDD method to the request, if the condition is satisfied.

In the sixth aspect of the present invention, there is provided a channel assigning method for assigning a channel for use in communication between a mobile station and a base station having one or more service areas, the method comprising the steps of:

judging, when a request for channel assignment is issued, whether a condition that it is possible to assign both a channel for a service area based on a FDD method and a channel for a service area based on a TDD method to the request, is satisfied, and a type of communication related to the request; and assigning either the channel for the service area based on the FDD method or the channel for the service area based on the TDD method to the request depending on the type of communication, if the condition is satisfied.

Here, the assigning step may assign the channel for the service area based on the FDD method to the request, if the type of communication is voice communication and the condition is satisfied, and assign the channel for the service area based on the TDD method to the request, if the type of communication is data communication and the condition is satisfied.

In the seventh aspect of the present invention, there is provided a channel assigning method for assigning a channel for use in communication between a mobile station and a base station having one or more service areas, the method comprising the steps of:

detecting a mobile station to which a channel for a service area based on a TDD method is currently assigned and a channel for a service area based on a FDD method can be assigned and whose handover frequency is high; and switching the assigned channel of the detected mobile station from the channel for the service area based on the TDD method to the channel for the service area based on the FDD method.

In the eighth aspect of the present invention, there is provided a channel assigning method for assigning a channel for use in communication between a mobile station and a base station having one or more service areas, the method comprising the steps of:

detecting a mobile station to which a channel for a service area based on a FDD method is currently assigned and a channel for a service area based on a TDD method can be assigned and whose handover frequency is low; and switching the assigned channel of the detected mobile station from the channel for the service area based on the FDD method to the channel for the service area based on the TDD method.

In the ninth aspect of the present invention, there is provided a channel assigning method for assigning a channel for use in communication between a mobile station and a base station having one or more service areas, the method comprising the steps of:

detecting a mobile station to which a channel for a service area based on a TDD method is currently assigned and a channel for a service area based on a FDD method can be assigned and whose transmission power is high; and switching the assigned channel of the detected mobile station from the channel for the service area based on the TDD method to the channel for the service area based on the FDD method.

In the tenth aspect of the present invention, there is provided a channel assigning method for assigning a channel for use in communication between a mobile station and a base station having one or more service areas, the method comprising the steps of:

detecting a mobile station to which a channel for a service area based on a FDD method is currently assigned and a channel for a service area based on a TDD method can be assigned and whose transmission power is low; and switching the assigned channel of the detected mobile station from the channel for the service area based on the FDD method to the channel for the service area based on the TDD method.

In the eleventh aspect of the present invention, there is provided a channel assigning method for assigning a channel for use in communication between a mobile station and a base station having one or more service areas, the method comprising the steps of:

detecting a mobile station to which a channel for a service area based on a TDD method is currently assigned and a channel for a service area based on a FDD method can be assigned and whose reception power of a forward common channel of a base station with which the mobile station currently communicates is low; and switching the assigned channel of the detected mobile station from the channel for the service area based on the TDD method to the channel for the service area based on the FDD method.

In the twelfth aspect of the present invention, there is provided a channel assigning method for assigning a channel for use in communication between a mobile station and a base station having one or more service areas, the method comprising the steps of:

detecting a mobile station to which a channel for a service area based on a FDD method is currently assigned and a channel for a service area based on a TDD method can be assigned and whose reception power of a forward common channel of a base station with which the mobile station currently communicates is high; and switching the assigned channel of the detected mobile station from the channel for the service area based on the FDD method to the channel for the service area based on the TDD method.

In the thirteenth aspect of the present invention, there is provided a channel assigning method for assigning a channel for use in communication between a mobile station and a base station having one or more service areas, the method comprising the steps of:

detecting a mobile station to which a channel for a service area based on a TDD method is currently assigned and a channel for a service area based on a FDD method can be assigned and which has a balance between reverse traffic and forward traffic; and switching the assigned channel of the detected mobile station from the channel for the service area based on the TDD method to the channel for the service area based on the FDD method.

In the fourteenth aspect of the present invention, there is provided a channel assigning method for assigning a channel for use in communication between a mobile station and a base station having one or more service areas, the method comprising the steps of:

detecting a mobile station to which a channel for a service area based on a FDD method is currently assigned and a channel for a service area based on a TDD method can be assigned and which does not have a balance between reverse traffic and forward traffic; and switching the assigned channel of the detected mobile station from the channel for the service area based on the FDD method to the channel for the service area based on the TDD method.

In the fifteenth aspect of the present invention, there is provided a channel assigning method for assigning a channel for use in communication between a mobile station and a base station having one or more service areas, the method comprising the steps of:

detecting a mobile station to which a channel for a service area based on a TDD method is currently assigned and a channel for a service area based on a FDD method can be assigned and which achieves a balance between reverse traffic and forward traffic of the service area based on the FDD method, if the assigned channel of the mobile station is switched from the channel for the service area based on the TDD method to the channel for the service area based on the FDD method; and switching the assigned channel of the detected mobile station from the channel for the service area based on the TDD method to the channel for the service area based on the FDD method.

In the sixteenth aspect of the present invention, there is provided a channel assigning method for assigning a channel for use in communication between a mobile station and a base station having one or more service areas, the method comprising the steps of:

detecting a mobile station to which a channel for a service area based on a FDD method is currently assigned and a channel for a service area based on a TDD method can be assigned and which achieves a balance between reverse traffic and forward traffic of the service area based on the FDD method, if the assigned channel of the mobile station is switched from the channel for the service area based on the FDD method to the channel for the service area based on the TDD method; and switching the assigned channel of the detected mobile station from the channel for the service area based on the FDD method to the channel for the service area based on the TDD method.

In the seventeenth aspect of the present invention, there is provided a channel assigning method for assigning a channel for use in communication between a mobile station and a base station having one or more service areas, the method comprising the steps of:

detecting a mobile station to which a channel for a service area based on a TDD method is currently assigned and a channel for a service area based on a FDD method can be assigned and which currently performs a particular type of communication; and switching the assigned channel of the detected mobile station from the channel for the service area based on the TDD method to the channel for the service area based on the FDD method.

Here, the particular type of communication may be voice communication.

In the eighteenth aspect of the present invention, there is provided a channel assigning method for assigning a channel for use in communication between a mobile station and a base station having one or more service areas, the method comprising the steps of:

detecting a mobile station to which a channel for a service area based on a FDD method is currently assigned and a channel for a service area based on a TDD method can be assigned and which currently performs a particular type of communication; and switching the assigned channel of the detected mobile station from the channel for the service area based on the FDD method to the channel for the service area based on the TDD method.

Here, the particular type of communication may be data communication.

Here, the detecting step may be performed, if traffic or interference of the service area based on the TDD method is high.

Here, the detecting step may be performed, if traffic or interference of the service area based on the FDD method is high.

In the nineteenth aspect of the present invention, there is provided a channel assigning method for assigning a channel for use in communication between a mobile station and a base station having one or more service areas, the method comprising the steps of:

detecting a mobile station to which a channel for a service area based on a TDD method is currently assigned and a channel for a service area based on a FDD method can be assigned, if traffic or interference of the service area based on the TDD method is high; and switching the assigned channel of the detected mobile station from the channel for the service area based on the TDD method to the channel for the service area based on the FDD method.

In the twentieth aspect of the present invention, there is provided a channel assigning method for assigning a channel for use in communication between a mobile station and a base station having one or more service areas, the method comprising the steps of:

detecting a mobile station to which a channel for a service area based on a FDD method is currently assigned and a channel for a service area based on a TDD method can be assigned, if traffic or interference of the service area based on the FDD method is high; and switching the assigned channel of the detected mobile station from the channel for the service area based on the FDD method to the channel for the service area based on the TDD method.

Here, the FDD method may be a CDMA-FDD method and the TDD method may be a CDMA-TDD method.

In the twenty-first aspect of the present invention, there is provided a communication apparatus for assigning a channel for use in communication between a mobile station and a base station having one or more service areas, the apparatus comprising:

means for judging, when a request for channel assignment is issued, whether a condition that it is possible to assign both a channel for a service area based on a FDD method and a channel for a service area based on a TDD method to the request, is satisfied; and means for assigning the channel for the service area based on the FDD method to the request, if the condition is satisfied.

In the twenty-second aspect of the present invention, there is provided a communication apparatus for assigning a channel for use in communication between a mobile station and a base station having one or more service areas, the apparatus comprising:

means for judging, when a request for channel assignment is issued, whether a condition that it is possible to assign both a channel for a service area based on a FDD method and a channel for a service area based on a TDD method to the request, and a handover frequency of the mobile station related to the request is high, is satisfied; and means for assigning the channel for the service area based on the FDD method to the request, if the condition is satisfied.

In the twenty-third aspect of the present invention, there is provided a communication apparatus for assigning a channel for use in communication between a mobile station and a base station having one or more service areas, the apparatus comprising:

means for judging, when a request for channel assignment is issued, whether a condition that it is possible to assign both a channel for a service area based on a FDD method and a channel for a service area based on a TDD method to the request, and a handover frequency of the mobile station related to the request is low, is satisfied; and means for assigning the channel for the service area based on the TDD method to the request, if the condition is satisfied.

In the twenty-fourth aspect of the present invention, there is provided a communication apparatus for assigning a channel for use in communication between a mobile station and a base station having one or more service areas, the apparatus comprising:

means for judging, when a request for channel assignment is issued, whether a condition that it is possible to assign both a channel for a service area based on a FDD method and a channel for a service area based on a TDD method to the request, and the maximum reception power value of a forward common channel of the mobile station related to the request is low, is satisfied; and means for assigning the channel for the service area based on the FDD method to the request, if the condition is satisfied.

In the twenty-fifth aspect of the present invention, there is provided a communication apparatus for assigning a channel for use in communication between a mobile station and a base station having one or more service areas, the apparatus comprising:

means for judging, when a request for channel assignment is issued, whether a condition that it is possible to assign both a channel for a service area based on a FDD method and a channel for a service area based on a TDD method to the request, and the maximum reception power value of a forward common channel of the mobile station related to the request is high, is satisfied; and means for assigning the channel for the service area based on the TDD method to the request, if the condition is satisfied.

In the twenty-sixth aspect of the present invention, there is provided a communication apparatus for assigning a channel for use in communication between a mobile station and a base station having one or more service areas, the apparatus comprising:

means for judging, when a request for channel assignment is issued, whether a condition that it is possible to assign both a channel for a service area based on a FDD method and a channel for a service area based on a TDD method to the request, is satisfied, and a type of communication related to the request; and means for assigning either the channel for the service area based on the FDD method or the channel for the service area based on the TDD method to the request depending on the type of communication, if the condition is satisfied.

In the twenty-seventh aspect of the present invention, there is provided a communication apparatus for assigning a channel for use in communication between a mobile station and a base station having one or more service areas, the apparatus comprising:

means for detecting a mobile station to which a channel for a service area based on a TDD method is currently assigned and a channel for a service area based on a FDD method can be assigned and whose handover frequency is high; and means for switching the assigned channel of the detected mobile station from the channel for the service area based on the TDD method to the channel for the service area based on the FDD method.

In the twenty-eighth aspect of the present invention, there is provided a communication apparatus for assigning a channel for use in communication between a mobile station and a base station having one or more service areas, the apparatus comprising:

means for detecting a mobile station to which a channel for a service area based on a FDD method is currently assigned and a channel for a service area based on a TDD method can be assigned and whose handover frequency is low; and means for switching the assigned channel of the detected mobile station from the channel for the service area based on the FDD method to the channel for the service area based on the TDD method.

In the twenty-ninth aspect of the present invention, there is provided a communication apparatus for assigning a channel for use in communication between a mobile station and a base station having one or more service areas, the apparatus comprising:

means for detecting a mobile station to which a channel for a service area based on a TDD method is currently assigned and a channel for a service area based on a FDD method can be assigned and whose transmission power is high; and means for switching the assigned channel of the detected mobile station from the channel for the service area based on the TDD method to the channel for the service area based on the FDD method.

In the thirtieth aspect of the present invention, there is provided a communication apparatus for assigning a channel for use in communication between a mobile station and a base station having one or more service areas, the apparatus comprising:

means for detecting a mobile station to which a channel for a service area based on a FDD method is currently assigned and a channel for a service area based on a TDD method can be assigned and whose transmission power is low; and means for switching the assigned channel of the detected mobile station from the channel for the service area based on the FDD method to the channel for the service area based on the TDD method.

In the thirty-first aspect of the present invention, there is provided a communication apparatus for assigning a channel for use in communication between a mobile station and a base station having one or more service areas, the apparatus comprising:

means for detecting a mobile station to which a channel for a service area based on a TDD method is currently assigned and a channel for a service area based on a FDD method can be assigned and whose reception power of a forward common channel of a base station with which the mobile station currently communicates is low; and means for switching the assigned channel of the detected mobile station from the channel for the service area based on the TDD method to the channel for the service area based on the FDD method.

In the thirty-second aspect of the present invention, there is provided a communication apparatus for assigning a channel for use in communication between a mobile station and a base station having one or more service areas, the apparatus comprising:

means for detecting a mobile station to which a channel for a service area based on a FDD method is currently assigned and a channel for a service area based on a TDD method can be assigned and whose reception power of a forward common channel of a base station with which the mobile station currently communicates is high; and means for switching the assigned channel of the detected mobile station from the channel for the service area based on the FDD method to the channel for the service area based on the TDD method.

In the thirty-third aspect of the present invention, there is provided a communication apparatus for assigning a channel for use in communication between a mobile station and a base station having one or more service areas, the apparatus comprising:

means for detecting a mobile station to which a channel for a service area based on a TDD method is currently assigned and a channel for a service area based on a FDD method can be assigned and which has a balance between reverse traffic and forward traffic; and means for switching the assigned channel of the detected mobile station from the channel for the service area based on the TDD method to the channel for the service area based on the FDD method.

In the thirty-fourth aspect of the present invention, there is provided a communication apparatus for assigning a channel for use in communication between a mobile station and a base station having one or more service areas, the apparatus comprising:

means for detecting a mobile station to which a channel for a service area based on a FDD method is currently assigned and a channel for a service area based on a TDD method can be assigned and which does not have a balance between reverse traffic and forward traffic; and means for switching the assigned channel of the detected mobile station from the channel for the service area based on the FDD method to the channel for the service area based on the TDD method.

In the thirty-fifth aspect of the present invention, there is provided a communication apparatus for assigning a channel for use in communication between a mobile station and a base station having one or more service areas, the apparatus comprising:

means for detecting a mobile station to which a channel for a service area based on a TDD method is currently assigned and a channel for a service area based on a FDD method can be assigned and which achieves a balance between reverse traffic and forward traffic of the service area based on the FDD method, if the assigned channel of the mobile station is switched from the channel for the service area based on the TDD method to the channel for the service area based on the FDD method; and means for switching the assigned channel of the detected mobile station from the channel for the service area based on the TDD method to the channel for the service area based on the FDD method.

In the thirty-sixth aspect of the present invention, there is provided a communication apparatus for assigning a channel for use in communication between a mobile station and a base station having one or more service areas, the apparatus comprising:

means for detecting a mobile station to which a channel for a service area based on a FDD method is currently assigned and a channel for a service area based on a TDD method can be assigned and which achieves a balance between reverse traffic and forward traffic of the service area based on the FDD method, if the assigned channel of the mobile station is switched from the channel for the service area based on the FDD method to the channel for the service area based on the TDD method; and means for switching the assigned channel of the detected mobile station from the channel for the service area based on the FDD method to the channel for the service area based on the TDD method.

In the thirty-seventh aspect of the present invention, there is provided a communication apparatus for assigning a channel for use in communication between a mobile station and a base station having one or more service areas, the apparatus comprising:

means for detecting a mobile station to which a channel for a service area based on a TDD method is currently assigned and a channel for a service area based on a FDD method can be assigned and which currently performs a particular type of communication; and means for switching the assigned channel of the detected mobile station from the channel for the service area based on the TDD method to the channel for the service area based on the FDD method.

In the thirty-eighth aspect of the present invention, there is provided a communication apparatus for assigning a channel for use in communication between a mobile station and a base station having one or more service areas, the apparatus comprising:

means for detecting a mobile station to which a channel for a service area based on a FDD method is currently assigned and a channel for a service area based on a TDD method can be assigned and which currently performs a particular type of communication; and means for switching the assigned channel of the detected mobile station from the channel for the service area based on the FDD method to the channel for the service area based on the TDD method.

In the thirty-ninth aspect of the present invention, there is provided a communication apparatus for assigning a channel for use in communication between a mobile station and a base station having one or more service areas, the apparatus comprising:

means for detecting a mobile station to which a channel for a service area based on a TDD method is currently assigned and a channel for a service area based on a FDD method can be assigned, if traffic or interference of the service area based on the TDD method is high; and means for switching the assigned channel of the detected mobile station from the channel for the service area based on the TDD method to the channel for the service area based on the FDD method.

In the fortieth aspect of the present invention, there is provided a communication apparatus for assigning a channel for use in communication between a mobile station and a base station having one or more service areas, the apparatus comprising:

means for detecting a mobile station to which a channel for a service area based on a FDD method is currently assigned and a channel for a service area based on a TDD method can be assigned, if traffic or interference of the service area based on the FDD method is high; and means for switching the assigned channel of the detected mobile station from the channel for the service area based on the FDD method to the channel for the service area based on the TDD method.

Here, the communication apparatus may be a control station which controls a base station.

Here, the communication apparatus may be a base station.

With this configuration, appropriate channel assignment can be executed in a mobile communication system when both a channel for a service area based on a FDD method and a channel for a service area based on a TDD method can be assigned.

The above and other objects, effects, features, and advantages of the present invention will become more apparent from the following description of embodiments thereof taken in conjunction with the accompanying drawings.

DETAILED DESCRIPTION OF PREFERRED EMBODIMENTS

Embodiments of the present invention will be described below with reference to the drawings.

Figure 1:
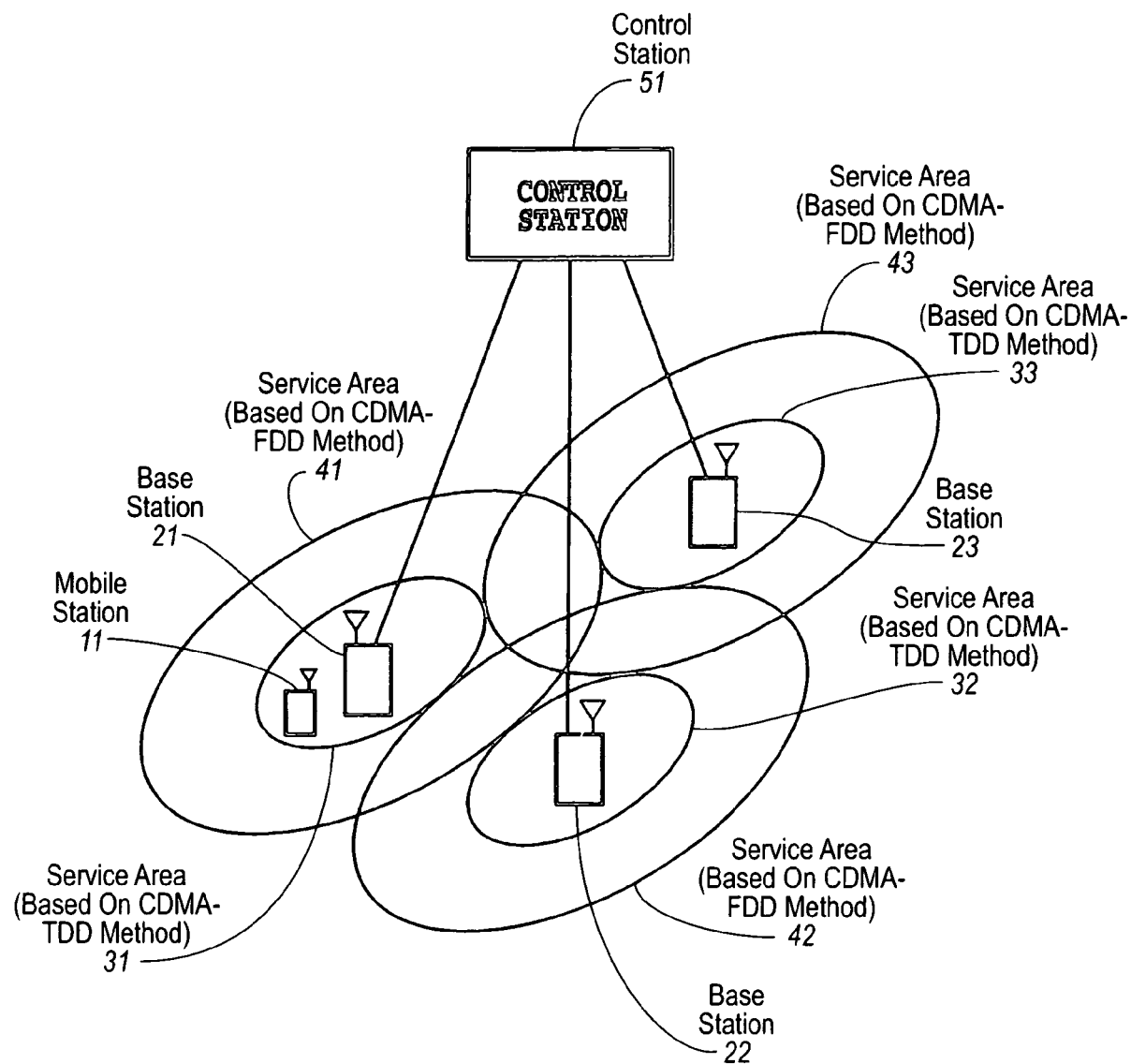
FIG. 1 is a diagram showing an example of a mobile communication system.

FIG. 1 is a diagram showing an example of a mobile communication system. In the example shown in FIG. 1, each base station provides the same service using both a CDMA-FDD method and a CDMA-TDD method.

Figure 4:
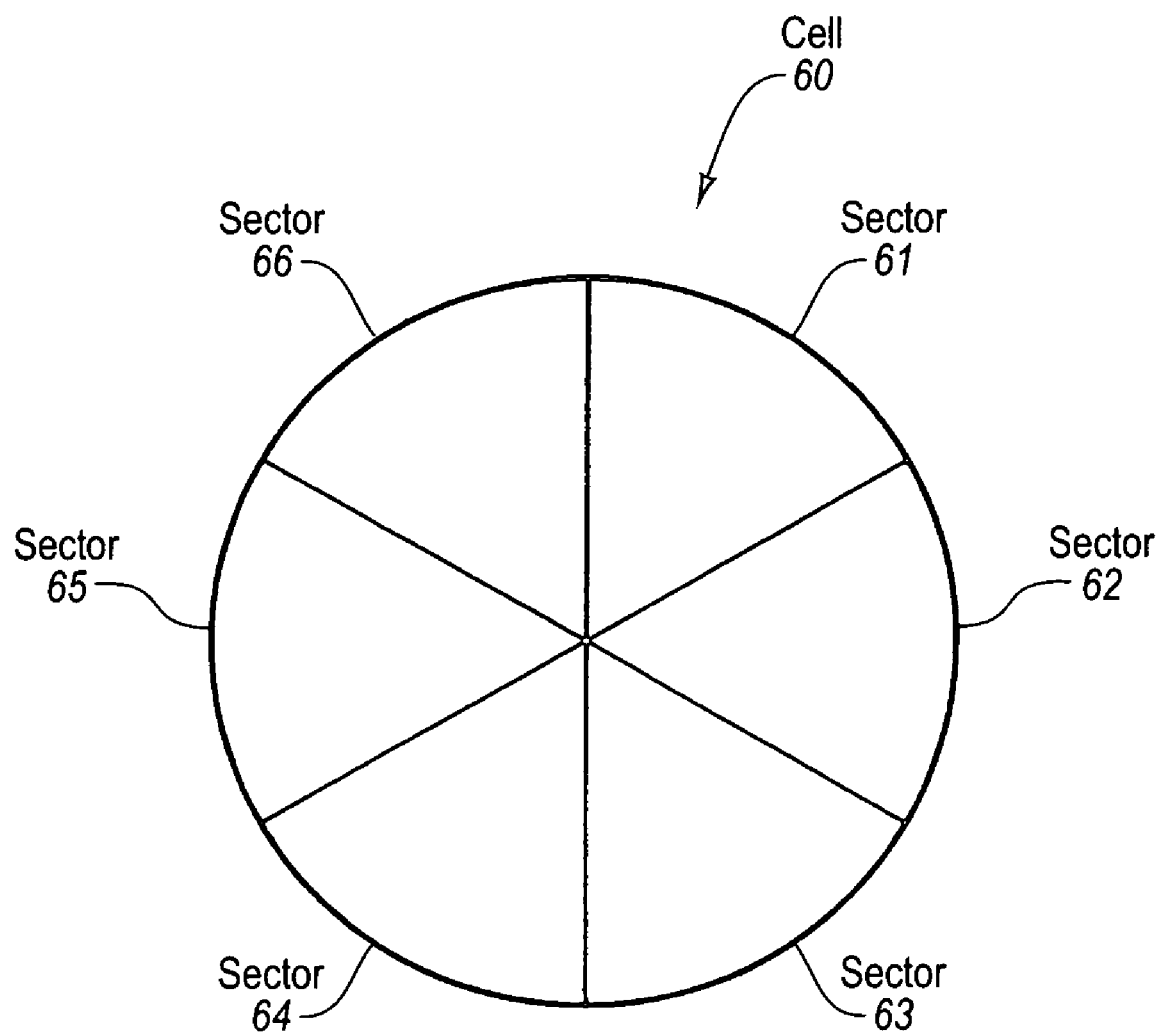
FIG. 4 is a diagram showing an example in which one cell is divided into six cells.

Further, in the example in FIG. 1, each base station has a service area (cell) based on the CDMA-FDD method and a service area (cell) based on the CDMA-TDD method. However, for example, the cell may be divided into a plurality of sectors so that one base station has a plurality of service areas (sectors) for each of the methods. In the example shown in FIG. 4, a cell 60 is divided into six sectors 61–66.

In the example in FIG. 1, a base station 21 has a service area 31 based on the CDMA-TDD method and a service area 41 based on the CDMA-FDD method. Further, the base station 22 has a service area 32 based on the CDMA-TDD method and a service area 42 based on the CMDA-FDD method. The base station 23 has a service area 33 based on the CDMA-TDD method and a service area 43 based on the CMDA-FDD method. If, for example, a mobile station 11 is located both in the service area 31 based on the CDMA-TDD method and in the service area 41 based on the CDMA-FDD method, then it can make radio communication with the base station 21 based on either the CDMA-TDD method or the CDMA-FDD method.

A control station 51 controls each base station and manages channels used for the radio communication between a mobile station and a base station. That is, the control station 51 determines and manages the current states of the channels (channels used in each service area, vacant channels, etc.). If the control station receives a request for channel assignment, it assigns a channel taking the current states of the channels into consideration. The request for channel assignment is issued when a call is made in a service area, when a handover call is transferred to a service area from another service area, or in other cases.

Figure 2:
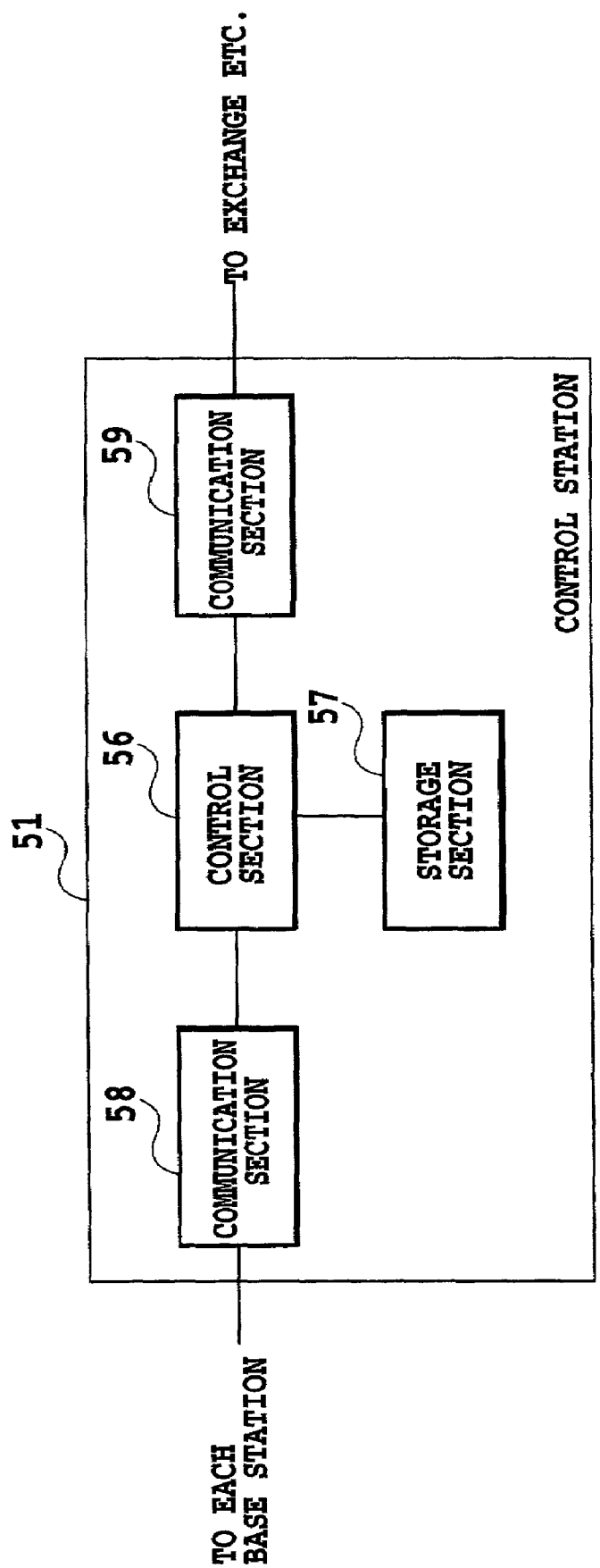
FIG. 2 is a block diagram showing an example of the configuration of a control station.

FIG. 2 is a block diagram showing an example of the configuration of a control station. A control station 51, shown in FIG. 2 comprises a control section 56, a storage section 57, and communication sections 58 and 59. The control section 56 provides various types of control. The storage section 57 stores the current statuses of the channels, and the control section 56 assigns channels taking their stored current states into consideration. The control section 56 can also communicate with each base station via the communication section 58 and with an exchange or the like via the communication section 59.

The sizes of service areas will be described. With the CDMA-TDD method, transmission time is divided into slots, so that if transmission power is set as high as that in the CDMA-FDD method, a service area based on the CDMA-FDD method is generally larger than that based on the CDMA-TDD method, as shown in FIG. 1. If the size of the service area based on the CDMA-FDD method is intentionally reduced as in the center of a city or for other reasons, it may be substantially equal to that of the service area based on the CDMA-TDD method, or on the contrary, the size of the service area based on the CDMA-TDD method may be larger than that of the service area based on the CDMA-FDD method.

Figure 3:
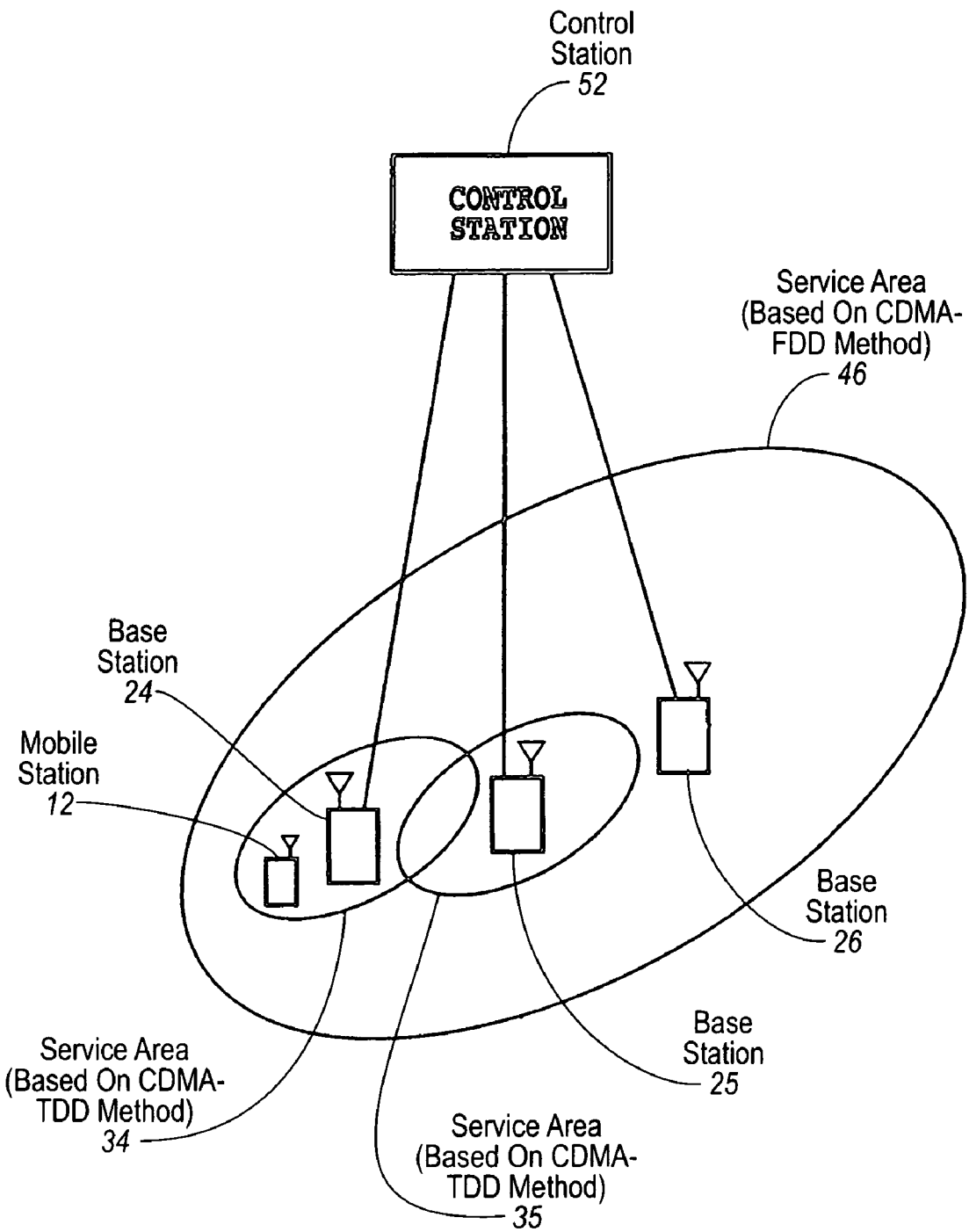
FIG. 3 is a diagram showing another example of the mobile communication system.

FIG. 3 is a diagram showing another example of a mobile communication system. This figure shows an example in which some base stations provide services based on the CDMA-FDD method, whereas the other stations provide services based on the CDMA-TDD method.

In the example shown in FIG. 3, each base station is provided with one service area (cell). However, for example, the cell may be divided into a plurality of sectors so that one base station has a plurality of service areas (sectors).

In the example in FIG. 3, a base station 24 has a service area 34 based on the CDMA-TDD method, a base station 25 has a service area 35 based on the CDMA-TDD method, and a base station 26 has a service area 46 based on the CDMA-FDD method. When, for example, a mobile station 12 is located both in the service area 34 based on the CDMA-TDD method and in the service area 46 based on the CDMA-FDD method, it can make radio communication with the base station 24 or 26 based on either the CDMA-TDD method or the CDMA-FDD method.

A control station 52 controls each base station and manages channels used for the radio communication between a mobile station and a base station. When the control station receives a request for channel assignment, it assigns a channel taking the current states of the channels into consideration. Like the control station 51, the control station 52 can be configured as shown in FIG. 2.

Each Embodiment of the present invention will be described below in detail. For example, the configuration of the mobile communication system shown in FIG. 1 or 3 can be used as a configuration of a mobile communication system in each embodiment.

First Embodiment

In the first embodiment of the present invention, if it is possible to assign both a channel for a service area based on a FDD method and a channel for a service area based on a TDD method (communication is enabled on the basis of the assignment) to a request for channel assignment when the request is issued, the channel for the service area based on the CDMA-FDD method is assigned. That is, when the request is issued, whether a condition that it is possible to assign both a channel for a service area based on a FDD method and a channel for a service area based on a TDD method to a request for channel assignment is judged, and if the condition is satisfied, the channel for the service area based on the CDMA-FDD method is assigned to the request.

Figure 5:
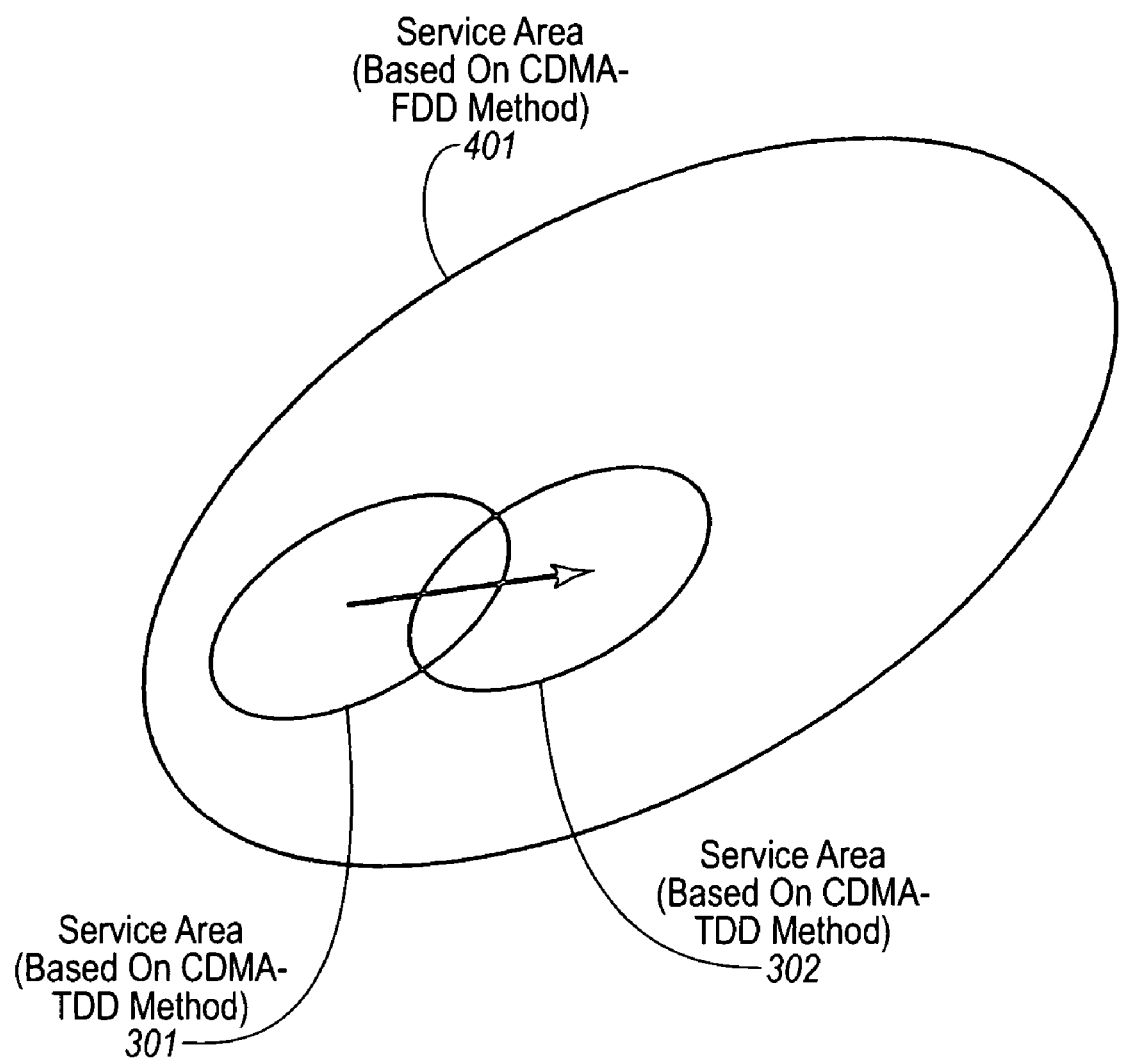
FIG. 5 is a diagram showing an example of movement of a mobile station.

For example, if a mobile station to which a channel for a service area 301 based on the CDMA-TDD method is currently assigned moves to a service area 302 (performs a handover) as shown in FIG. 5, whether a channel for a service area 401 based on the CDMA-FDD method or a channel for a service area 302 based on the CDMA-TDD method is assigned to this mobile station will be a problem. Further, if a call is made in the service area 302, a similar problem occurs.

In this embodiment, the channel for the service area 401 based on the CDMA-FDD method is assigned on the basis of, for example, the fact that service areas based on the CDMA-FDD method are generally larger than those based on the CDMA-TDD method and handovers are less likely to be performed in the service areas based on the CDMA-FDD method, and in the CDMA-FDD method, it is easier to use a soft handover and increase the frequency use efficiency.

In this embodiment, the mobile station receives a forward common channel (for example, a perch channel) to determine, as required, the service area of the corresponding base station in which the mobile station is located (through which service area the mobile station can be assigned with a channel) and reports it to the control station.

Second Embodiment

In the second embodiment of the present invention, if it is possible to assign both a channel for a service area based on a FDD method and a channel for a service area based on a TDD method to a request for channel assignment when the request is issued, the channel for the service area based on the CDMA-FDD method is assigned if a handover frequency of the mobile station related to the request is high, and the channel for the service area based on the CDMA-TDD method is assigned if the handover frequency of the mobile station related to the request is low.

Also in this embodiment, on the basis of, for example, the fact that service areas based on the CDMA-FDD method are generally larger than those based on the CDMA-TDD method, and handovers are less likely to be performed in the service areas based on the CDMA-FDD method, a channel for a service area based on the CDMA-FDD method is assigned to a frequently moving mobile station (that has preformed many handovers), whereas a channel for a service area based on the CDMA-TDD method is assigned to an infrequently moving mobile station (that has preformed few handovers).

Whether the mobile station has performed many or few handovers can be determined by comparing, for example, the number of handovers performed after a call has been made, the number of handovers during a certain past period, or the like with a corresponding threshold.

Figure 6:
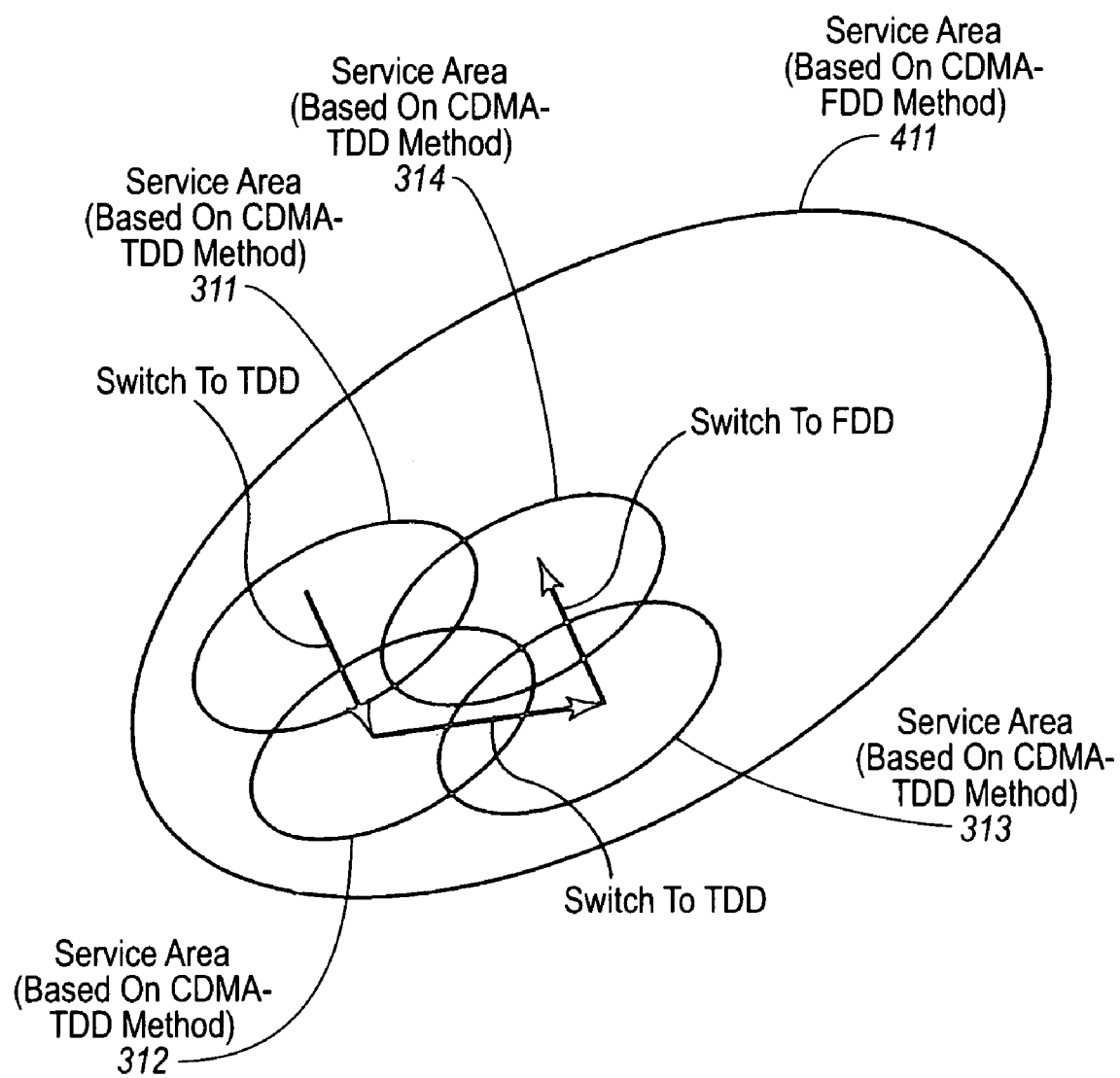
FIG. 6 is a diagram showing another example of movement of the mobile station.

For example, if the mobile station moves as shown in FIG. 6, a channel for a service area based on the CDMA-TDD method is assigned to this mobile station for the first two movements, and a channel for a service area based on the CDMA-FDD method is assigned to this mobile station for the third movement. In FIG. 6, reference numerals 311 to 314 denote service areas based on the CDMA-TDD method, and reference numeral 411 denotes a service area based on the CDMA-FDD method.

In this embodiment, the mobile station is assigned with a channel for a service area based on the CDMA-FDD method if it frequently performs handovers, whereas it is assigned with a channel for a service area based on the CDMA-TDD method if it infrequently performs handovers. For example, such assignment can be carried out only if the mobile station frequently performs handovers (assignment of a channel for a service area based on the CDMA-FDD method), whereas a channel assigning method is determined in accordance with another criterion (for example, the number of vacant channels of each method) if the mobile station infrequently performs handovers.

In the above description, the case that the request for channel assignment is issued is considered, but the above process may be executed even if the mobile station has already been assigned with any channel and does not perform handovers. That is, it is possible to detect a mobile station to which a channel for a service area based on a CDMA-TDD method is currently assigned and a channel for a service area based on a CDMA-FDD method can be assigned and whose handover frequency is high, and switch the assigned channel of the detected mobile station from the channel for the service area based on the CDMA-TDD method to the channel for the service area based on the CDMA-FDD method. Such detection (switching) may be performed if traffic or interference of the service area based on the CDMA-TDD method is high.

On the other hand, it is possible to detect a mobile station to which a channel for a service area based on a CDMA-FDD method is currently assigned and a channel for a service area based on a CDMA-TDD method can be assigned and whose handover frequency is low, and switch the assigned channel of the detected mobile station from the channel for the service area based on the CDMA-FDD method to the channel for the service area based on the CDMA-TDD method. Such detection (switching) may be performed if traffic or interference of the service area based on the CDMA-FDD method is high.

Third Embodiment

In the third embodiment of the present invention, a mobile station to which a channel for a service area based on a CDMA-TDD method is currently assigned and a channel for a service area based on a CDMA-FDD method can be assigned and whose transmission power is high is detected, if traffic or interference of the service area based on the CDMA-TDD method is high, and the assigned channel of the detected mobile station is switched from the channel for the service area based on the CDMA-TDD method to the channel for the service area based on the CDMA-FDD method.

Figure 7:
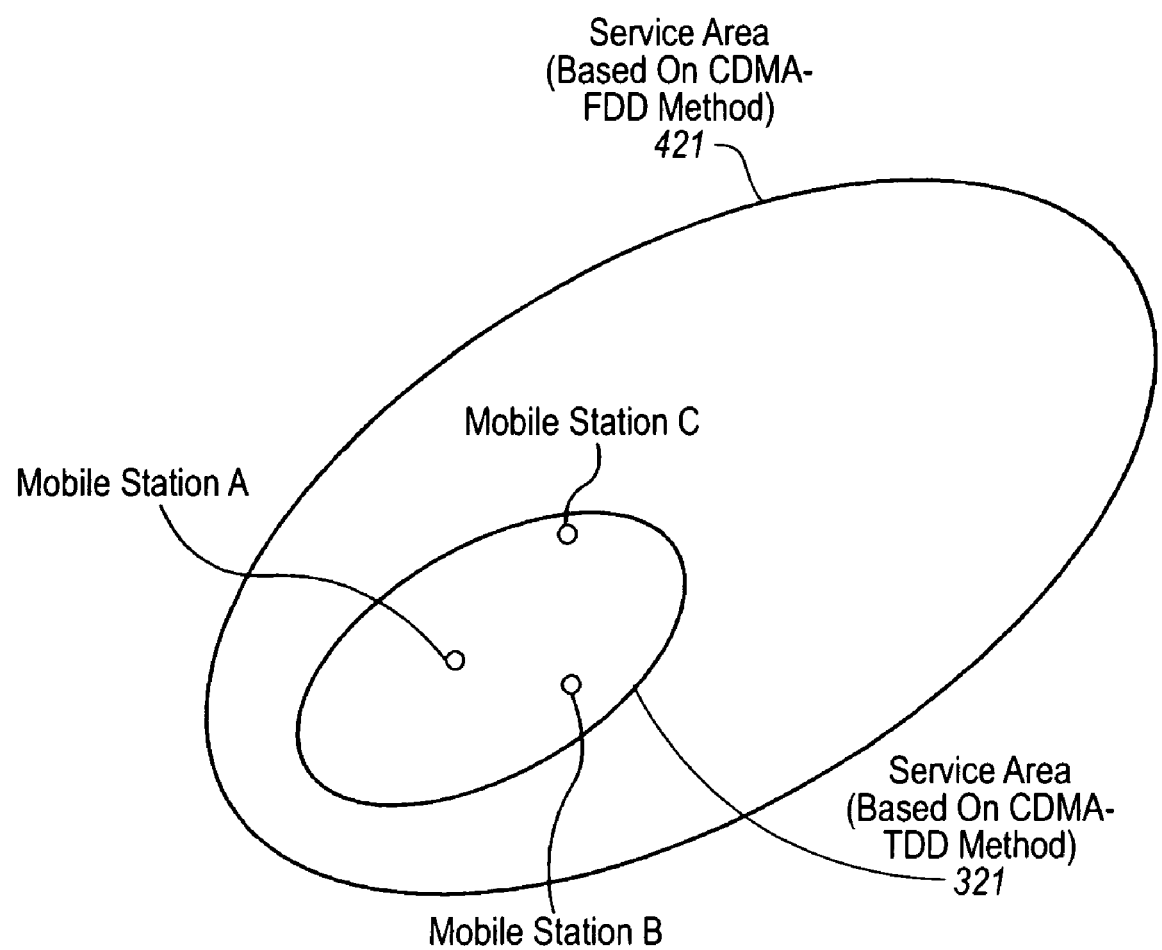
FIG. 7 is a diagram showing an example of the locations of mobile stations.
Figure 8:
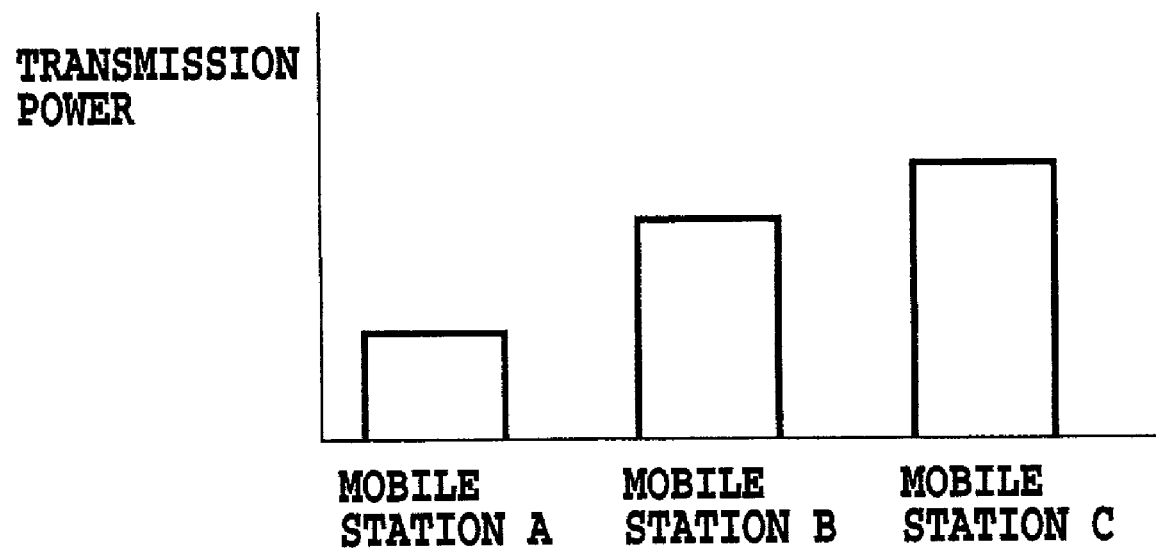
FIG. 8 is a diagram of an example of transmission power from the mobile stations.

For example, in FIG. 7, it is assumed that mobile stations A-C currently assigned with a channel for a service area 321 based on the CDMA-TDD method are located as shown in FIG. 7 and have transmission power as shown in FIG. 8. In this state, if traffic or interference of the service area 321 based on the CDMA-TDD method is high, then in this embodiment, as required, the mobile stations have their assignment channel switched from the channel based on the CDMA-TDD channel (the channel for the service area 321 based on the CDMA-TDD channel) to a channel based on the CDMA-FDD method (the channel for a service area 421 based on the CDMA-FDD channel), in the descending order of the magnitude of the transmission power, that is, in the order of the mobile stations C, B, and A. The reason for this switching operation is as follows: If the mobile station C is assigned with a channel based on the CDMA-TDD method, it significantly affects the interference in the service area 321 based on the CDMA-TDD method. Thus, for proper channel assignment between the service area 321 based on the CDMA-TDD method and the service area 421 based on the CDMA-FDD method, mobile stations such as the mobile station C are preferably assigned with a channel based on the CDMA-FDD method, whereas mobile stations such as the mobile station A are preferably assigned with a channel based on the CDMA-TDD method.

Accordingly, it is possible to detect a mobile station to which a channel for a service area based on a CDMA-FDD method is currently assigned and a channel for a service area based on a CDMA-TDD method can be assigned and whose transmission power is low, if traffic or interference of the service area based on the CDMA-FDD method is high, and to switch the assigned channel of the detected mobile station from the channel for the service area based on the CDMA-FDD method to the channel for the service area based on the CDMA-TDD method.

Moreover, in this embodiment, a mobile station to undergo switching is determined on the basis of its transmission power, but the switching operation may be performed on the basis of reception power of a forward common channel by a mobile station. That is, it is possible to detect a mobile station to which a channel for a service area based on a CDMA-TDD method is currently assigned and a channel for a service area based on a CDMA-FDD method can be assigned and whose reception power of a forward common channel of a base station with which the mobile station currently communicates is low, if traffic or interference of the service area based on the CDMA-TDD method is high, and to switch the assigned channel of the detected mobile station from the channel for the service area based on the CDMA-TDD method to the channel for the service area based on the CDMA-FDD method. This is because a mobile station whose reception power of a forward common channel of a base station with which the mobile station currently communicates is low should be far from that base station and should have high transmission power.

On the other hand, it is possible to detect a mobile station to which a channel for a service area based on a CDMA-FDD method is currently assigned and a channel for a service area based on a CDMA-TDD method can be assigned and whose reception power of a forward common channel of a base station with which the mobile station currently communicates is high, if traffic or interference of the service area based on the CDMA-FDD method is high, and to switch the assigned channel of the detected mobile station from the channel for the service area based on the CDMA-FDD method to the channel for the service area based on the CDMA-TDD method. This is because a mobile station whose reception power of a forward common channel of a base station with which the mobile station currently communicates is high should be close to that base station and should have low transmission power.

In this embodiment, the detection (switching) is performed if traffic or interference of a service area is high, but may be performed regardless of the level of the traffic or interference.

Further, it is possible to assign a channel for a service area based on a CDMA-FDD method when a request for channel assignment is issued, if it is possible to assign both the channel for the service area based on the CDMA-FDD method and a channel for a service area based on a CDMA-TDD method to the request, and the maximum reception power value of a forward common channel of the mobile station related to the request is low. This is because if channel assignment is executed with the low maximum reception power value of the forward common channel, the mobile station is likely to have high transmission power after the channel assignment.

On the other hand, it is possible to assign a channel for a service area based on a CDMA-TDD method when a request for channel assignment is issued, if it is possible to assign both the channel for the service area based on the CDMA-FDD method and a channel for a service area based on a CDMA-TDD method to the request, and the maximum reception power value of a forward common channel of the mobile station related to the request is high. This is because if channel assignment is executed with the high maximum reception power value of the forward common channel, the mobile station is likely to have low transmission power after the channel assignment.

In this connection, the transmission power of the mobile station or the reception power of the perch channel may be reported to the control station by, for example, the mobile station as required.

Fourth Embodiment

In the fourth embodiment of the present invention, a mobile station to which a channel for a service area based on a CDMA-TDD method is currently assigned and a channel for a service area based on a CDMA-FDD method can be assigned and which has a balance between reverse traffic (traffic of communication from the mobile station to the base station) and forward traffic (traffic of communication from the base station to the mobile station) is detected, if traffic or interference of the service area based on the CDMA-TDD method is high, and the assigned channel of the detected mobile station is switched from the channel for the service area based on the CDMA-TDD met hod to the channel for the service area based on the CDMA-FDD method.

Further, a mobile station to which a channel for a service area based on a CDMA-FDD method is currently assigned and a channel for a service area based on a CDMA-TDD method can be assigned and which does not have a balance between reverse traffic and forward traffic is detected, if traffic or interference of the service area based on the CDMA-FDD method is high, and the assigned channel of the detected mobile station is switched from the channel for the service area based on the CDMA-FDD method to the channel for the service area based on the CDMA-TDD method.

Figure 9:
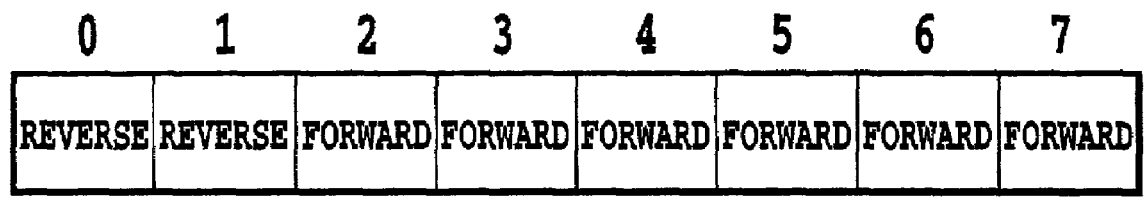
FIG. 9 is a diagram showing an example of assignments of time slots.

Such switching operation is performed because the CDMA-TDD method can handle unbalanced traffic more appropriately than the CDMA-FDD method. With the CDMA-TDD method, if the traffic is unbalanced, assigned time slots can be set so as to correspond to the balance state between the reverse traffic and the forward traffic, for example, as shown in FIG. 9.

In this regard, the reverse traffic and the forward traffic are relatively often balanced in voice communication and are relatively often unbalanced in data communication.

Accordingly, a mobile station currently engaged in voice communication can have its assigned channel switched from one based on the CDMA-TDD method to one based on the CDMA-FDD method, without the need to check whether or not the reverse traffic and the forward traffic are balanced. In contrast, a mobile station currently engaged in data communication can have its assigned channel switched from one based on the CDMA-FDD method to one based on the CDMA-TDD method.

With regard to the type of communication in which the mobile station is currently engaged, a mobile station for which the channels based on the CDMA-TDD and CDMA-FDD methods are to be switched may be selected on the basis of a type other than voice communication and data communication.

In this embodiment, the detection (switching) is performed if traffic or interference of the service area is high, but may be performed regardless of the level of the traffic or interference.

In this embodiment, a mobile station which has a balance between reverse traffic and forward traffic has its assigned channel switched to one based on the CDMA-FDD method. However, a mobile station which achieves a balance between reverse traffic and forward traffic of a service area based on the CDMA-FDD method by switching its assigned channel from one based on the CDMA-TDD method to the one based on the CDMA-FDD method may have its assigned channel switched to the one based on the CDMA-TDD method to one based on the CDMA-FDD method. For example, in a service area based on the CDMA-FDD method, if the forward traffic is higher than the reverse traffic, the switching operation is performed on a mobile station in which the reverse traffic is higher than the forward traffic.

In this embodiment, a mobile station which does not have a balance between reverse traffic and forward traffic has its assigned channel switched to one based on the CDMA-TDD method. However, a mobile station which achieves a balance between reverse traffic and forward traffic of a service area based on the CDMA-FDD method by switching its assigned channel from one based on the CDMA-FDD method to the one based on the CDMA-TDD method may have its assigned channel switched to the one based on the CDMA-FDD method to one based on the CDMA-TDD method.

Moreover, it is possible to assign either a channel for a service area based on a CDMA-FDD method or a channel for a service area based on a CDMA-TDD method depending on a type of communication related to a request for channel assignment when the request is issued, if it is possible to assign both the channel for the service area based on the CDMA-FDD method and the channel for the service area based on the CDMA-TDD method to the request. If the type of communication related to the request is, for example, voice communication, the channel for the service area based on the CDMA-FDD method is assigned. On the other hand, if the type of communication related to the request is data communication, the channel for the service area based on the CDMA-TDD method is assigned.

Other Embodiments

In the above description, if traffic or interference of a service area based on a certain method is high, a mobile station to be switched to a channel based on another method is determined on the basis of a certain criterion (handover frequency etc.). Various criteria, however, may be used, and as a simple criterion, such mobile station may be selected randomly.

Further, in the above embodiments, the control station assigns channels, but a different participant (for example, one of the base stations) may perform this operation.

Further, in the above description, the case in which the CDMA-FDD method and the CDMA-TDD method are used is considered. However, the present invention can be applied to a case in which another FDD method and another TDD method are used.

As described above, according to the present invention, appropriate channel assignment can be executed in a mobile communication system when both a channel for a service area based on a FDD method and a channel for a service area based on a TDD method can be assigned.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A channel assigning method for assigning a channel for use in communication between a mobile station and a base station having one or more service areas, said method comprising the steps of:

judging, when a request for channel assignment is issued, whether a condition that it is possible to assign both a channel for a service area based on a FDD method and a channel for a service area based on a TDD method to said request, and the number of handovers that the mobile station related to said request has performed in the past is high is satisfied; and assigning the channel for the service area based on the FDD method to said request, if said condition is satisfied.

2. A channel assigning method for assigning a channel for use in communication between a mobile station and a base station having one or more service areas, said method comprising the steps of:

judging, when a request for channel assignment is issued, whether a condition that it is possible to assign both a channel for a service area based on a FDD method and a channel for a service area based on a TDD method to said request, and the number of handovers that the mobile station related to said request has performed in the past is low is satisfied; and assigning the channel thy the service area based on the TDD method to said request, if said condition is satisfied.

3. A channel assigning method for assigning a channel for use in communication between a mobile station and a base station having one or more service areas, said method comprising the steps of:

judging, when a request for channel assignment is issued, whether a condition that it is possible to assign both a channel for a service area based on a FDD method and a channel for service based on a TDD method to said request, and the maximum reception power value of a forward common channel of the mobile station related to said request is low, is satisfied; and assigning the channel for the service area based on the FDD method to said request, if said condition is satisfied.

4. A channel assigning method for assigning a channel for use in communication between a mobile station and a base station having one or more service areas, said method comprising the steps of:

judging, when a request for channel assignment is issued, whether a condition that it is possible to assign both a channel for a service area based on a FDD method and a channel for, service based on a TDD method to said request, and the maximum reception power value of a forward common channel of the mobile station related to said request is high, is satisfied; and assigning the channel for the service area based on the TDD method to said request, if said condition is satisfied.

5. A channel assigning method for assigning a channel for use in communication between a mobile station and a base station having one or more service areas, said method comprising the steps of:

judging, when a request for channel assignment is issued, whether a condition that it is possible to assign both a channel for a service area based on a FDD method and a channel for a service area based on a TDD method to said request, is satisfied, and a type of communication related to said request; and assigning either the channel for the service area based on the FDD method or the channel for the service area based on the TDD method to said request depending on said type of communication if said condition is satisfied, wherein said assigning step assigns the channel for the service area based on the FDD method to said request, if said type of communication is voice communication and said condition is satisfied, and assigns the channel for the service area based on the TDD method to said request, if said type of communication is data communication and said condition is satisfied.

6. A channel assigning method for assigning a channel for use in communication between a mobile station and a base station having one or more service areas, said method comprising the steps of:

detecting a mobile station to which a channel for a service area based on a TDD method is currently assigned and a channel for a service area based on a FDD method can he assigned and whose number of handovers performed in the past is high; and switching time assigned channel of the detected mobile station from the channel for the service area based on the TDD method to the channel for the service area based on the FDD method.

7. A channel assigning method for assigning a channel for use in communication between a mobile station and a base station having one or more service areas, said method comprising the steps of:

detecting a mobile station to which a channel for a service area based on a FDD method is currently assigned and a channel for a service area based on a TDD method can be assigned and whose number of handovers performed in the past is low; and switching the assigned channel of the detected mobile station from the channel for the service area based on the FDD method to the channel for the service area based on the TDD method.

8. A channel assigning method for assigning a channel for use in communication between a mobile station and a base station having one or more service areas, said method comprising the steps of:

detecting a mobile station to which a channel for a service area based on a TDD method is currently assigned and a channel for a service area based on a FDD method can be assigned and whose transmission power is high; and switching the assigned channel of the detected mobile station from the channel for the service area based on the TDD method to the channel for the service area based on the FDD method.

9. A channel assigning method for assigning a channel for use in communication between a mobile station and a base station having one or more service areas, said method comprising the steps of:

detecting a mobile station to which a channel for a service area based on a FDD method is currently assigned and a channel for a service area based on a TDD method can be assigned and whose transmission power is low; and switching the assigned channel of the detected mobile station from the channel for the service area based on the FDD method to the channel for the service area based on the TDD method.

10. A channel assigning method for assigning a channel for use in communication between a mobile station and a base station having one or more service areas, said method comprising the steps of:

detecting a mobile station to which a channel for a service area based on a TDD method currently assigned and a channel for a service area based on a FDD method can be assigned and whose reception power of a forward common channel of a base station with which the mobile station currently communicates is low; and switching the assigned channel of the detected mobile station from the channel for the service area based on the TDD method to the channel for the service area based on the FDD method.

11. A channel assigning method for assigning a channel for use in communication between a mobile station and a base station having one or more service areas, said method comprising the steps of:

detecting a mobile station to which a channel for a service area based on a FDD method is currently assigned and a channel for a service area based on a TDD method can be assigned and whose reception power of a forward common channel of a base station with which the mobile station currently communicates is high; and switching the assigned channel of the detected mobile station from the channel for the service area based on the FDD method to the channel for the service area based on the TDD method.

12. A channel assigning method for assigning a channel for use in communication between a mobile station and a base station having one or more service areas, said method comprising the steps of:

detecting a mobile station to which a channel for a service area based on a TDD method is currently assigned and a channel for a service area based on a FDD method can be assigned and which has a balance between reverse traffic and forward traffic; and switching the assigned channel of the detected mobile station from the channel for the service area based on TDD method to the channel for the service area based on the FDD method.

13. A channel assigning method for assigning a channel for use in communication between a mobile station and a base station having one or more service areas, said method comprising the steps of:

detecting a mobile station to which a channel for a service area based on a FDD method is currently assigned and is channel for a service area based on a TDD method can be assigned and which does not have a balance between reverse traffic and forward traffic; and switching the assigned channel of the detected mobile station from the channel for the service area based on FDD method to the channel for the service area based on the TDD method.

14. A channel assigning method for assigning a channel for use in communication between a mobile station and a base station having one or more service areas, said method comprising the steps of:

detecting a mobile station to which a channel for a service area based on a TDD method is currently assigned and a channel for a service area based on a FDD method can be assigned and which achieves a balance between reverse traffic and forward traffic of the service area based on the FDD method, if the assigned channel of the mobile station is switched from the channel for the service area based on the TDD method to the channel for the service area based on the FDD method; and switching the assigned channel of the detected mobile station from the channel for the service area based on TDD method to the channel for the service area based on the FDD method.

15. A channel assigning method for assigning a channel for use in communication between a mobile station and a base station having one or more service areas, said method comprising the steps of:

detecting a mobile station to which a channel for a service area based on a FDD method is currently assigned and a channel for a service area based on a TDD method can be assigned and which achieves a balance between reverse traffic and forward traffic of the service area based on the FDD method, if the assigned channel of the mobile station is switched from the channel for the service area based on the FDD method to the channel for the service area based on the TDD method; and switching the assigned channel of the detected mobile station from the channel for the service area based on the FDD method to the channel for the service area based on the TDD method.

16. A channel assigning method for assigning a channel for use in communication between a mobile station and a base station having one or more service areas, said method comprising the steps of:

detecting a mobile station to which a channel for a service area based on a TDD method is currently assigned and a channel for a service area based on a FDD method can be assigned and which currently performs a particular type of communication; and switching the assigned channel of the detected mobile station from the channel for the service area based on the TDD method to the channel for the service area based on the FDD method.

17. The channel assigning method as claimed in claim 16, wherein said particular type of communication is voice communication.

18. A channel assigning method for assigning a channel for use in communication between a mobile station and a base station having one or more service areas, said method comprising the steps of:

detecting a mobile station to which a channel for a service area based on a FDD method is currently assigned and a channel for a service area based on a TDD method can be assigned and which currently performs a particular type of communication; and switching the assigned channel of the detected mobile station from the channel for the service area based on the FDD method to the channel for the service area based on the TDD method.

19. The channel assigning method as claimed in claim 18, wherein said particular type of communication is data communication.

20. The channel assigning method as claimed in claim 6, 8, 10, 12, 14, or 16, wherein said detecting step is performed, if traffic or interference of the service area based on the TDD method is high.

21. The channel assigning method as claimed in claim 7, 9, 11, 13, 15, or 18, wherein said detecting step is performed, if traffic or interference of the service area based on the FDD method is high.

22. A channel assigning method for assigning a channel for use in communication between a mobile station and a base station having one or more service areas, said method comprising the steps of:

detecting a mobile station to which a channel for a service area based on a TDD method is currently assigned and a channel for a service area based on a FDD method can be assigned, if traffic or interference of the service area based on the TDD method is high; and switching the assigned channel of the detected mobile station from the channel for the service area based on the TDD method to the channel for the service area based on the FDD method.

23. A channel assigning method for assigning a channel for use in communication between a mobile station and a base station having one or more service areas, said method comprising the steps of:

detecting a mobile station to which a channel for a service area based on a FDD method is currently assigned and a channel for a service area based on a TDD method can be assigned, if traffic or interference of the service area based on the FDD method is high; and switching the assigned channel of the detected mobile station from the channel for the service area based on the FDD method to the channel for the service area based on the TDD method.

24. The channel assigning method as claimed in any one of claims 1–4, 5–16, 18, 22, and 23, wherein said FDD method is a CDMA-FDD method and said TDD method is a CDMA-TDD method.

25. A communication apparatus for assigning a channel for use in communication between a mobile station and a base station having one or more service areas, said apparatus comprising:

means for judging, when a request for channel assignment is issued, whether a condition that it is possible to assign both a channel for a service area based on a FDD method and a channel for a service area based on a TDD method to said request, and the number of handovers that the mobile station related to said request has performed in the past is high, is satisfied; and means for assigning the channel for the service area based on the FDD method to said request, if said condition is satisfied.

26. A communication apparatus for assigning a channel for use in communication between a mobile station and a base station having one or more service areas, said apparatus comprising:

means for judging, when a request for channel assignment is issued, whether a condition that it is possible to assign both a channel for a service area based on a FDD method and a channel for a service area based on a TDD method to said request, and the number of handovers that the mobile station related to said request has performed in the past is low, is satisfied; and means for assigning the channel for the service area based on the TDD method to said request, if said condition is satisfied.

27. A communication apparatus for assigning a channel for use in communication between a mobile station and a base station having one or more service areas, said apparatus comprising:

means for judging, when a request for channel assignment is issued, whether a condition that it is possible to assign both a channel for a service area based on a FDD method and a channel for service area based on a TDD method to said request, and the maximum reception power value of a forward common channel of the mobile station related to said request is low, is satisfied; and means for assigning the channel for the service area based on the FDD method to said request, if said condition is satisfied.

28. A communication apparatus for assigning a channel for use in communication between a mobile station and a base station having one or more service areas, said apparatus comprising:

means for judging, when a request for channel assignment is issued, whether a condition that it is possible to assign both a channel for a service area based on a FDD method and a channel for service area based on a TDD method to said request, and the maximum reception power value of a forward common channel of the mobile station related to said request is high, is satisfied; and means for assigning the channel for the service area based on the TDD method to said request, if said condition is satisfied.

29. A communication apparatus for assigning a channel for use in communication between a mobile station and a base station having one or more service areas, said apparatus comprising:

means for judging, when a request for channel assignment is issued, whether a condition that it is possible to assign both a channel for a service area based on a FDD method and a channel for service area based on a TDD method to said request, is satisfied, and a type of communication related to said request; and means for assigning either the channel for the service area based on the FDD method or the channel for the service area based on the TDD method to said request depending on said type of communication, if said communication is satisfied, wherein said means for assigning assigns the channel for the service area based on the FDD method to said request, if said typo of communication is voice communication and said condition is satisfied, and assigns the channel for the service area based on the TDD method to said request, if said type of communication is data communication and said condition is satisfied.

30. A communication apparatus for assigning a channel for use in communication between a mobile station and a base station having one or more service areas, said apparatus comprising:

means for detecting a mobile station to which a channel for a service area based on a TDD method is currently assigned and a channel for a service area based on a FDD method can be assigned and whose number of handovers performed in the past is high; and means for switching the assigned channel of the detected mobile station from the channel for the service area based on the TDD method to the channel for the service area based on the FDD method.

31. A communication apparatus for assigning a channel for use in communication between a mobile station and a base station having one or more service areas, said apparatus comprising:

means for detecting a mobile station to which a channel for a service area based on FDD method is currently assigned and a channel for a service area based on a TDD method can be assigned and whose number of handovers performed in the past is low; and means for switching the assigned channel of the detected mobile station from the channel for the service area based on the FDD method to the channel for the service area based on the TDD method.

32. A communication apparatus for assigning a channel for use in communication between a mobile station and a base station having one or more service areas, said apparatus comprising:

means for detecting a mobile station to which a channel for a service area based on a TDD method is currently assigned and a channel for a service area based on a FDD method can be assigned and whose transmission power is high; and means for switching the assigned channel of the detected mobile station from the channel for the service area based on the TDD method to the channel for the service area based on the FDD method.

33. A communication apparatus for assigning a channel for use in communication between a mobile station and a base station having one or more service areas, said apparatus comprising:

means for detecting a mobile station to which a channel for a service area based on a FDD method is currently assigned and a channel for a service area based on a TDD method can be assigned and whose transmission power is low; and means for switching the assigned channel of the detected mobile station from the channel for the service area based on the FDD method to the channel for the service area based on the TDD method.

34. A communication apparatus for assigning a channel for use in communication between a mobile station and a base station having one or more service areas, said apparatus comprising:

means for detecting a mobile station to which a channel for a service area based on a TDD method is currently assigned and a channel for a service area based on a FDD method can be assigned and whose reception power of a forward common channel of a base station with which the mobile station currently communicates is low; and means for switching the assigned channel of the detected mobile station from the channel for the service area based on the TDD method to the channel for the service area based on the FDD method.

35. A communication apparatus for assigning a channel for use in communication between a mobile station and a base station having one or more service areas, said apparatus comprising:

means for detecting a mobile station to which a channel for a service area based on a FDD method is currently assigned and a channel for a service area based on a TDD method can be assigned and whose reception power of a forward common channel of a base station with which the mobile station currently communicates is high; and means for switching the assigned channel of the detected mobile station from the channel for the service area based on the FDD method to the channel for the service area based on the TDD method.

36. A communication apparatus for assigning a channel for use in communication between a mobile station and a base station having one or more service areas, said apparatus comprising:

means for detecting a mobile station to which a channel for a service area based on a TDD method is currently assigned and a channel for a service area based on a FDD method can be assigned and which has a balance between reverse traffic and forward traffic; and means for switching the assigned channel of the detected mobile station from the channel for the service area based on the TDD method to the channel for the service area based on the FDD method.

37. A communication apparatus for assigning a channel for use in communication between a mobile station and a base station having one or more service areas, said apparatus comprising:

means for detecting a mobile station to which a channel for a service area based on a FDD method is currently assigned and a channel for a service area based on a TDD method can be assigned and which does not have a balance between reverse traffic and forward traffic; and means for switching the assigned channel of the detected mobile station from the channel for the service area based on the FDD method to the channel for the service area based on the TDD method.

38. A communication apparatus for assigning a channel for use in communication between a mobile station and a base station having one or more service areas, said apparatus comprising:
  means for detecting a mobile station to which a channel for a service area based on a TDD method is currently assigned and a channel for a service area based on a FDD method can be assigned and which achieves a balance between reverse traffic and forward traffic of the service area based on the FDD method, if the assigned channel of the mobile station is switched from the channel for the service area based on the TDD method to the channel for the service area based on the FDD method; and
  means for switching the assigned channel of the detected mobile station from the channel for the service area based on the TDD method to the channel for the service area based on the FDD method.

39. A communication apparatus for assigning a channel for use in communication between a mobile station and a base station having one or more service areas, said apparatus comprising:
  means for detecting a mobile station to which a channel for a service area based on a FDD method is currently assigned and a channel for a service area based on a TDD method can be assigned and which achieves a balance between reverse traffic and forward traffic of the service area based on the FDD method, if the assigned channel of the mobile station is switched from the channel for the service area based on the FDD method to the channel for the service area based on the TDD method; and
  means for switching the assigned channel of the detected mobile station from the channel for the service area based on the FDD method to the channel for the service area based on the TDD method.

40. A communication apparatus for assigning a channel for use in communication between a mobile station and a base station having one or more service areas, said apparatus comprising:
  means for detecting a mobile station to which a channel for a service area based on a TDD method is currently assigned and a channel for a service area based on a FDD method can be assigned and which currently performs a particular type of communication; and
  means for switching the assigned channel of the detected mobile station from the channel for the service area based on the TDD method to the channel for the service area based on the FDD method.

41. A communication apparatus for assigning a channel for use in communication between a mobile station and a base station having one or more service areas, said apparatus comprising:
  means for detecting a mobile station to which a channel for a service area based on a FDD method is currently assigned and a channel for a service area based on a TDD method can be assigned and which currently performs a particular type of communication; and
  means for switching the assigned channel of the detected mobile station from the channel for the service area based on the FDD method to the channel for the service area based on the TDD method.

42. A communication apparatus for assigning a channel for use in communication between a mobile station and a base station having one or more service areas, said apparatus comprising:
  means for detecting a mobile station to which a channel for a service area based on a TDD method is currently assigned and a channel for a service area based on a FDD method can be assigned, if traffic or interference of the service area based on the TDD method is high; and
  means for switching the assigned channel of the detected mobile station from the channel for the service area based on the TDD method to the channel for the service area based on the FDD method.

43. A communication apparatus for assigning a channel for use in communication between a mobile station and a base station having one or more service areas, said apparatus comprising:
  means for detecting a mobile station to which a channel for a service area based on a FDD method is currently assigned and a channel for a service area based on a TDD method can be assigned, if traffic or interference of the service area based on the FDD method is high; and
  means for switching the assigned channel of the detected mobile station from the channel for the service area based on the FDD method to the channel for the service area based on the TDD method.

44. The communication apparatus as claimed in any one of claims 25–43, wherein said communication apparatus is a control station which controls a base station.

45. The communication apparatus as claimed in any one of claims 25–43, wherein said communication apparatus is a base station.

* * * * *

UNITED STATES PATENT AND TRADEMARK OFFICE
CERTIFICATE OF CORRECTION

PATENT NO. : 7,116,647 B2
APPLICATION NO. : 09/889000
DATED : October 3, 2006
INVENTOR(S) : Uebayashi et al.

It is certified that error appears in the above-identified patent and that said Letters Patent is hereby corrected as shown below:

Column 12
Line 30, change "Embodiment" to --embodiment--

Column 16
Line 14, change "met hod" to --method--
Line 64, change "to" to --from--

Column 17
Line 12, change "to" to --from--

Column 18
Line 18, change "thy" to --for the--
Line 42, after "for" remove ","

Column 19
Line 11, change "he" to --be--
Line 59, after "method" insert --is--

Column 20
Line 34, change "is" to --a--

Column 23
Line 22, change "typo" to --type--

Signed and Sealed this

Third Day of July, 2007

JON W. DUDAS
*Director of the United States Patent and Trademark Office*